(12) United States Patent
Andronic

(10) Patent No.: US 11,092,940 B2
(45) Date of Patent: Aug. 17, 2021

(54) LIGHTNING OR OTHER SURGE DETECTION FOR WIRELESS TRANSMITTERS AND OTHER DEVICES

(71) Applicant: Honeywell International Inc., Morris Plains, NJ (US)

(72) Inventor: Cristian Andronic, Burnaby (CA)

(73) Assignee: Honeywell International Inc., Morris Plains, NJ (US)

( * ) Notice: Subject to any disclaimer, the term of this patent is extended or adjusted under 35 U.S.C. 154(b) by 370 days.

(21) Appl. No.: 15/904,881

(22) Filed: Feb. 26, 2018

(65) Prior Publication Data

US 2019/0265665 A1   Aug. 29, 2019

(51) Int. Cl.
*G05B 19/048* (2006.01)
*H02H 1/00* (2006.01)
*H02H 9/06* (2006.01)

(52) U.S. Cl.
CPC ......... *G05B 19/048* (2013.01); *H02H 1/0007* (2013.01); *H02H 1/0061* (2013.01); *H02H 1/0092* (2013.01); *G05B 2219/24015* (2013.01); *G05B 2219/25413* (2013.01); *H02H 9/06* (2013.01)

(58) Field of Classification Search
CPC .......... G05B 19/048; G05B 2219/2401; G05B 2219/25413; H02H 1/0061; H02H 1/009; H02H 9/06; H02H 1/0007; H02H 3/286; H02H 3/006; H05K 1/00; H05K 1/02; G01R 31/02; G01R 31/28; G01R 27/02; G01R 19/165

USPC .................. 324/500, 600, 710–714, 522
See application file for complete search history.

(56) References Cited

U.S. PATENT DOCUMENTS

| | | |
|---|---|---|
| 7,016,785 B2 | 3/2006 | Makela et al. |
| 2005/0197070 A1 | 9/2005 | Kaikuranta et al. |
| 2016/0285255 A1* | 9/2016 | O'Donnell ............. H02H 9/046 |
| 2017/0347413 A1* | 11/2017 | John ..................... H05B 45/50 |

* cited by examiner

*Primary Examiner* — Melissa J Koval
*Assistant Examiner* — Trung Q Nguyen
(74) *Attorney, Agent, or Firm* — Ortiz & Lopez, PLLC; Kermit D. Lopez; Luis M. Ortiz

(57) ABSTRACT

A method includes obtaining a voltage or current signal associated with a component of a device and isolating and conditioning the voltage or current signal to generate an output signal. The method also includes processing the output signal to identify one or more surge events, where each surge event is associated with an excessive voltage or current experienced by the device. The method further includes generating information associated with the one or more surge events and transmitting or storing the information. The voltage or current signal could be obtained from a case or housing of the device, a cable coupled to the device, or an antenna coupled to the device. The information associated with the one or more surge events could include a date/time stamp, a severity, a duration, or a shape or profile of each surge event.

20 Claims, 6 Drawing Sheets

US 11,092,940 B2

LIGHTNING OR OTHER SURGE DETECTION FOR WIRELESS TRANSMITTERS AND OTHER DEVICES

TECHNICAL FIELD

This disclosure generally relates to surge detection systems. More specifically, this disclosure relates to lightning or other surge detection for wireless transmitters and other devices.

BACKGROUND

Industrial process control and automation systems are often used to automate large and complex industrial processes. These types of control and automation systems routinely include a large number of devices, such as process controllers and field devices like sensors and actuators. At least some of the process controllers typically receive measurements from the sensors and generate control signals for the actuators. Higher-level components often interact with the process controllers and perform other functions in the control and automation systems, such as optimization or planning.

In many instances, equipment associated with control and automation systems and their underlying industrial processes can often be distributed over large areas. Wireless and wired transmitters are often used to communicate data associated with control and automation systems and their underlying industrial processes, such as for monitoring or control purposes. One issue observed in areas prone to thunderstorms and lightning is a higher failure rate of equipment, including transmitters. Such failures are often simply attributed to "being struck by lightning."

SUMMARY

This disclosure provides lightning or other surge detection for wireless transmitters and other devices.

In a first embodiment, a method includes obtaining a voltage or current signal associated with a component of a device and isolating and conditioning the voltage or current signal to generate an output signal. The method also includes processing the output signal to identify one or more surge events, where each surge event is associated with an excessive voltage or current experienced by the device. The method further includes generating information associated with the one or more surge events and transmitting or storing the information.

In a second embodiment, an apparatus includes a voltage/current isolator configured to receive and isolate a voltage or current signal associated with a component of a device. The apparatus also includes a signal conditioner configured to condition the voltage or current signal and generate an output signal. The apparatus further includes at least one processor configured to process the output signal, identify one or more surge events, and generate information associated with the one or more surge events. Each surge event is associated with an excessive voltage or current experienced by the device. The apparatus further includes an interface configured to transmit or store the information.

In a third embodiment, a method includes receiving information identifying one or more surge events associated with one or more devices in an industrial process control and automation system. The method also includes changing a mode of operation of at least one process controller based on the information. The change to the mode of operation of the at least one process controller alters how at least one industrial process is controlled by the at least one process controller.

In a fourth embodiment, a system includes the apparatus of the second embodiment or any of its dependent claims, as well as one or more additional device components. In a fifth embodiment, an apparatus includes at least one processing device configured to perform the method of the third embodiment or any of its dependent claims. In a sixth embodiment, a non-transitory computer readable medium contains instructions that when executed cause at least one processing device to perform the method of the third embodiment or any of its dependent claims.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
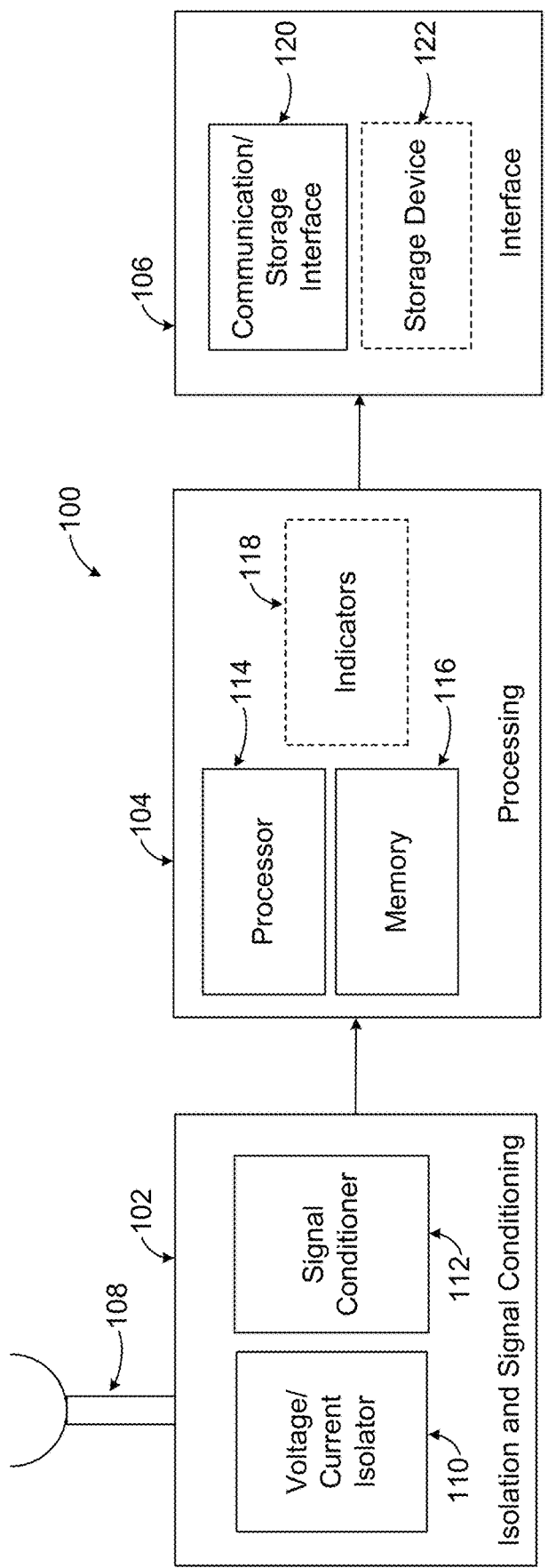
FIG. 1 illustrates an example surge detection circuit according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, equipment associated with control and automation systems and their underlying industrial processes can often be distributed over large areas. Wireless and wired transmitters are typically used to communicate data associated with control and automation systems and their underlying industrial processes, such as for monitoring or control purposes. One issue observed in areas prone to thunderstorms and lightning is a higher failure rate of equipment, including these types of transmitters. While such failures are often attributed to "being struck by lightning," it is often simply assumed that a device failure around the time of a thunderstorm was caused by lightning. This is usually not confirmed or recorded in any way. Many transmitters and other devices can be protected to some extent against lightning, but there is no indication if the devices were actually struck by lightning or if their performance has degraded over time due to lightning.

This disclosure provides various electronic circuits that can be used in or with transmitters or other devices. The electronic circuits include a detection circuit configured to detect lightning or other high-voltage or high-current surges being injected into a device case, cable, antenna, or other device component. The detection circuit triggers an input to a processing device, which logs the event. Data that is logged could include simply an identification of each event. Other data could also be logged, such as a date/time stamp for each event. Still other data could include one or more characteristics of each event (such as its duration, shape, or profile) or a total number of events (such as in a given time period or since counting was initiated). The data that is logged can be retrieved, either locally or remotely, for further analysis.

In this way, the electronic circuits can be used to detect when transmitters or other devices are actually struck by lightning or otherwise experience surges, and information associated with the surges can be recorded. By analyzing this information, it is possible for an owner or operator of the devices or of a system including the devices to determine whether there is adequate lightning/surge protection. For example, by analyzing the logged information, a determination can be made whether existing lightning/surge protections in a given location are adequate. It is also possible to analyze the logged information in order to determine whether lightning/surge protections are even needed in a given area. Further, the logged information can be analyzed and used for advanced or predictive maintenance. Examples of this maintenance could include determining whether the ground quality for certain areas or devices should be improved, identifying the statuses of various devices before anticipated thunderstorms, or replacing existing protection devices (such as gas discharge tubes, quarter wave surge arresters, or static discharge solutions) if the existing devices have been stressed due to previous surges. This can help to significantly improve lightning/surge protection schemes in given devices or systems and reduce down-time of the devices or systems.

FIG. 1 illustrates an example surge detection circuit 100 according to this disclosure. As shown in FIG. 1, the surge detection circuit 100 generally includes an isolation and signal conditioning unit 102, a processing unit 104, and an interface unit 106. The isolation and signal conditioning unit 102 generally operates to detect potential surges and provide a signal indicative of the potential surges to the processing unit 104. The processing unit 104 generally operates to record information about the potential surges. The interface unit 106 generally operates to store or transmit the information about the potential surges, such as to one or more external destinations (which may be local to or remote from the surge detection circuit 100).

The isolation and signal conditioning unit 102 in FIG. 1 is coupled to a signal pick-up 108 and includes a voltage/current isolator 110 and a signal conditioner 112. The signal pick-up 108 is configured to receive a voltage or current signal that is provided from a device's case, cable, antenna, or other device component. For example, the signal pick-up 108 could be physically coupled to a case, cable, antenna, or other device component and receive a voltage or current signal directly from that device component. The signal pick-up 108 could also be configured to generate a voltage or current signal based on inductive coupling or other indirect coupling to a device component. As particular examples, the signal pick-up 108 could be connected to a device chassis or split from a cable or antenna path of a device. The received or sensed voltage or current signal can be used as an indicator of whether the device or device component is experiencing a lightning strike or other high-voltage or high-current surge. The signal pick-up 108 includes any suitable structure configured to receive or generate a voltage or current signal used to sense a surge, such as an antenna.

The voltage/current isolator 110 receives a voltage or current signal from the signal pick-up 108 and operates to isolate other components of the surge detection circuit 100 from a high voltage or high current that could be received from the signal pick-up 108. For example, the voltage/current isolator 110 could receive a high-voltage or high-current signal from the signal pick-up 108 and generate a lower-voltage or lower-current replica for the signal conditioner 112. The voltage/current isolator 110 includes any suitable structure providing electrical isolation, such as an electrical transformer, an optical isolator, or an extremely large resistance or other impedance.

The signal conditioner 112 receives a signal from the voltage/current isolator 110 and converts the signal into a form that can be input to and used by the processing unit 104. For example, the signal conditioner 112 could perform clamping, rectification, and scaling of the signal received from the voltage/current isolator 110 so that the signal output to the processing unit 104 has one or more desired characteristics. As a particular example, the signal conditioner 112 could output an analog signal that does not exceed 3.3 volts or 5 volts (which is suitable for use by most digital processors), where the analog signal varies based on the sensed voltage or current. The signal conditioner 112 includes any suitable structure for altering voltages or currents, such as a voltage or current clamp, a rectifier, and a voltage or current scaler.

The signal provided from the isolation and signal conditioning unit 102 to the processing unit 104 is generally indicative of whether any surge events are occurring based on the voltage or current from the signal pick-up 108. For example, the isolation and signal conditioning unit 102 could output a signal with higher voltage/current levels when a surge event is occurring, and the isolation and signal conditioning unit 102 could output a signal with lower voltage/current levels when a surge event is not occurring.

The processing unit 104 receives and analyzes the signal from the isolation and signal conditioning unit 102. The processing unit 104 in FIG. 1 includes at least one processor 114 and at least one memory 116. Each processor 114 represents any suitable processing device, such as a microprocessor, microcontroller, digital signal processor (DSP), application specific integrated circuit (ASIC), field programmable gate array (FPGA), or discrete circuitry. Each memory 116 represents any structure configured to store and facilitate retrieval of information, such as data, program code, and/or other suitable information, on a temporary or permanent basis. Each memory 116 may represent any suitable volatile or non-volatile storage device, such as random access memory (RAM), read-only memory (ROM), hard drive, Flash memory, or optical disc. Note that the memory 116 could be incorporated into the processor 114 or omitted, such as when the processor 114 is programmed to perform certain functions.

The processor 114 receives the signal that is output from the isolation and signal conditioning unit 102 and analyzes the signal to identify any surge events and possibly one or more characteristics of the surge events. The processor 114 can output information about each of the surge events to the memory 116 for storage and/or to the interface unit 106 for storage or transmission.

The processor 114 can generate any suitable information about surge events. For example, the processor 114 could generate a flag or other indicator identifying that a surge event occurred, possibly along with a date/time stamp when the surge event occurred. In some embodiments, for instance, the processor 114 could compare the amplitude of the signal from the isolation and signal conditioning unit 102 to a threshold value in order to identify whether a surge event occurred. When the signal from the isolation and signal conditioning unit 102 is below the threshold value, no surge event may be detected. When the signal from the isolation and signal conditioning unit 102 is above the threshold value, a surge event may be detected. Multiple threshold values could also be used, such as when different threshold values correspond to different surge severities. In these embodiments, the processor 114 could both identify a surge event based on any threshold value being exceeded and identify its severity based on the specific threshold value being exceeded.

In some embodiments, the processor 114 could identify additional information about surge events. For example, the processor 114 could also identify a duration of each surge event, such as by measuring the amount of time that the amplitude of the signal from the isolation and signal conditioning unit 102 exceeds a threshold value. The processor 114 could further identify a shape or profile of the surge event, such as by detecting how the amplitude of the signal from the isolation and signal conditioning unit 102 varies over time. In addition, the processor 114 could count a number of surge events that occur, such as in a given time period. For instance, the processor 114 could include a single counter to count the number of surge events detected, or the processor 114 could include multiple counters to count the number of surges of different severities detected.

Note that the information generated by the processor 114 could vary as needed or desired based on a number of factors. For example, when the surge detection circuit 100 is used in a device or system that operates using a limited local power supply (such as a battery), the processor 114 could merely generate single-bit or multi-bit indicators identifying when surge events occur, possibly along with their severities. If desired, a date/time stamp could also be generated for each surge event. This information can be generated using limited computations by the processor 114, which can help to reduce the power consumed by the processor 114 to perform the surge detection operations. When the surge detection circuit 100 is used in a device or system that operates using externally-supplied power (such as from an AC power line), the processor 114 could generate additional information about the surge events (such as their durations, shapes, or profiles) that might require additional computations and therefore additional power consumption by the processor 114. Note, however, that this need not be the case, and the processor 114 could generate any suitable information regardless of the source of its operating power.

The processor 114 could perform any additional functions as needed or desired. For example, the processor 114 could be configured to analyze the data from the isolation and signal conditioning unit 102 and determine whether the data is indicative of potential damage to a transmitter or other larger device or system. As another example, the processor 114 could be configured to logically or physically disconnect a transmitter or other device from a larger system upon the detection of certain conditions, such as an over-voltage limit being exceeded. As particular examples, the processor 114 could cause a transmitter to physically disconnect from a larger industrial process control and automation system, or the processor 114 could prevent data from the transmitter from being used by a process controller or other device in a larger industrial process control and automation system.

The processing unit 104 may optionally include one or more indicators 118. The indicators 118 could be used to provide visual information to a local user that is near the surge detection circuit 100 or a device or system that includes or uses the surge detection circuit 100. For example, the indicators 118 could provide a visual indication that the surge detection circuit 100 has detected at least one surge above at least one threshold value. This may allow, for instance, maintenance personnel or other personnel to identify devices in a larger system that have suffered from one or more lightning strikes or other surges. The indicators 118 could provide any other information, such as a count of the number of surge events or an indication of whether the processor 114 has identified potential damage to the device or system that includes or uses the surge detection circuit 100. Each indicator 118 include any suitable structure configured to convey information, such as one or more light emitting diodes (LEDs) or a display screen.

The interface unit 106 receives data from the processing unit 104 and transmits or stores the data. The interface unit 106 in FIG. 1 includes at least one communication/storage interface 120, which supports the transfer of the data over one or more communication or storage links. For example, the interface 120 could format and transmit the data over one or more wired or wireless connections to one or more external destinations. The interface 120 could also or alternatively store the data in a local storage device 122, such as a removable Flash drive, Secure Digital (SD) card, or other removable memory. Each interface 120 includes any suitable structure configured to facilitate communication or storage of data. As particular examples, the interface 120 could include a Serial Peripheral Interface (SPI), an I$^2$C interface, or an input/output (I/O) interface. Each storage device 122 includes any suitable structure configured to store and facilitate retrieval of information. In some embodiments, a storage device 122 could be electrically isolated from a remainder of the surge detection circuit 100 so that data from the storage device 122 can be retrieved and analyzed even if other portions of the surge detection circuit 100 are damaged or destroyed due to surges or other causes.

Note that the surge detection circuit 100 shown in FIG. 1 and described above could be used to sense any electrical surges in a device or system that includes or uses the surge detection circuit 100. While often described as being used to detect lightning strikes, the surge detection circuit 100 could detect surges caused by other electro-static discharges, surges experienced over power supply lines, or other surges. In general, the surge detection circuit 100 could be used to identify any voltage or current surges experienced by a device or system, regardless of the source.

Also note that the surge detection circuit 100 shown in FIG. 1 and described above could be implemented within or as part of a device being monitored or as a stand-alone device. When implemented as a stand-alone device, the surge detection circuit 100 could be placed in proximity to the device being monitored or otherwise positioned so that the surge detection circuit 100 can detect surges in one or more components of the device being monitored.

Although FIG. 1 illustrates one example of a surge detection circuit 100, various changes may be made to FIG. 1. For example, the functional arrangement of components shown in the surge detection circuit 100 of FIG. 1 is for illustration only. Components could be added, omitted, combined, further subdivided, or placed in any other suitable configuration according to particular needs. Also, while often described in this document as being used in industrial process control and automation devices and systems, the surge detection circuit 100 could be used in any suitable devices and in any suitable systems (whether or not used for industrial process control and automation).

Figure 2:
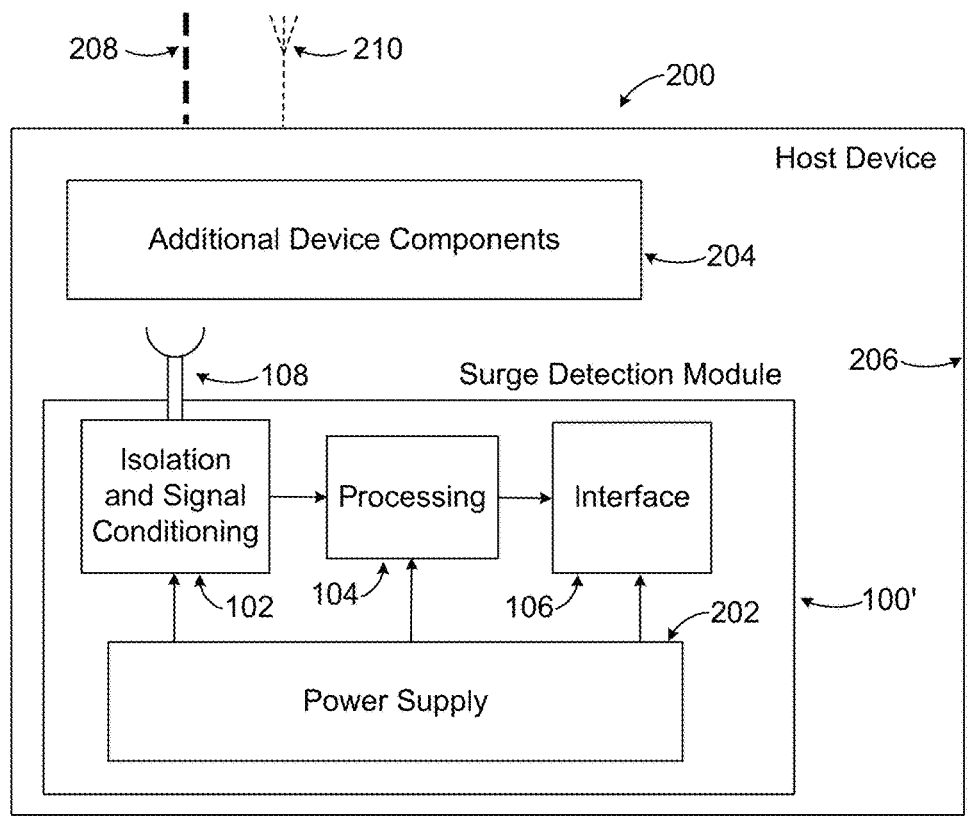
FIGS. 2 and 3 illustrate example devices containing surge detection circuits according to this disclosure.
Figure 3:
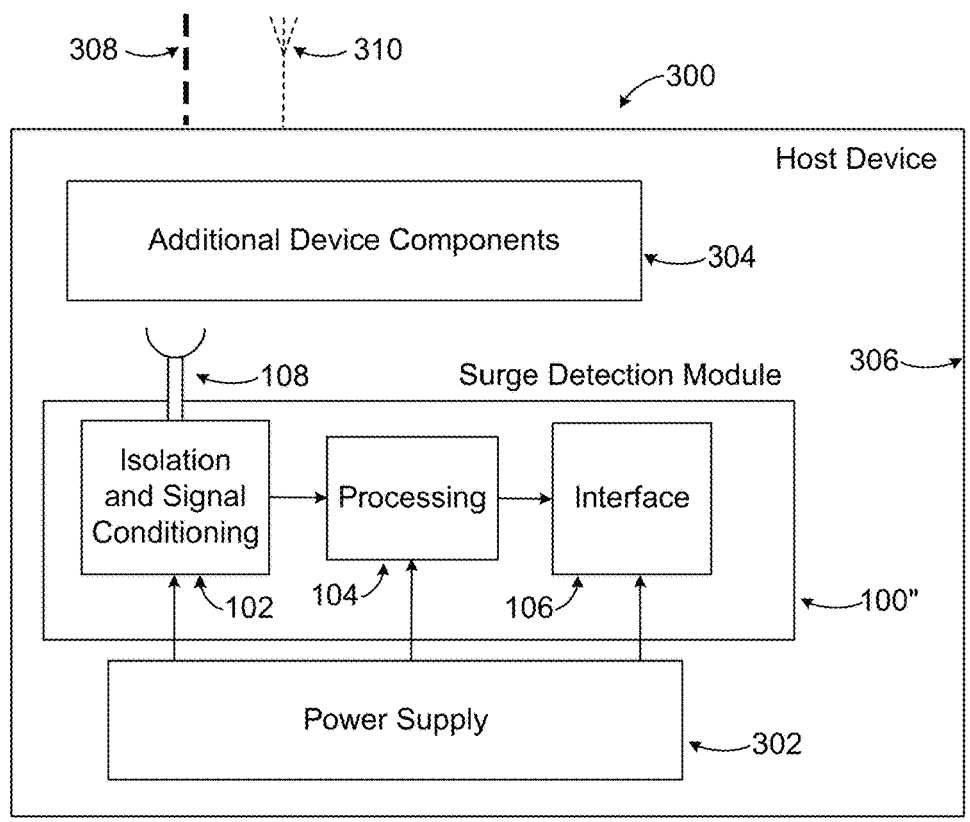

FIGS. 2 and 3 illustrate example devices 200 and 300 containing surge detection circuits according to this disclosure. As shown in FIG. 2, the device 200 includes a surge detection circuit 100', which could include the same or similar components as the surge detection circuit 100 of FIG. 1 described above. The surge detection circuit 100' here also includes a power supply 202, which can provide operating power to one or more components of the surge detection circuit 100'. The power supply 202 represents any suitable source of operating power used for surge detection functionality, such as one or more batteries, supercapacitors, solar cells, or fuel cells.

The device 200 here also includes various additional device components 204, which could perform any suitable operations depending on the intended application(s) or function(s) of the device 200. For example, if the device 200 represents an industrial control or automation field transmitter, the additional device components 204 could include a wired or wireless transceiver or separate transmitter or receiver, possibly along with components implementing a sensor or actuator. If the device 200 represents an industrial control or automation process controller, the additional device components 204 could include logic executed by a processor that determines how to adjust an industrial process. If the device 200 represents a computer or other processing device, the additional device components 204 could include one or more processors and one or more memories storing instructions and data used, generated, or collected by the device 200. The additional device components 204 could further include one or more surge protection components, such as one or more gas discharge tubes, quarter wave surge arresters, static discharge solutions, or lightning rods, that are designed to protect the device 200 against lightning or other surges. In addition, the additional device components 204 could include one or more additional power supplies, which can be used to power the additional device components 204. By providing the power supply 202 for use with the surge detection circuit 100', the surge detection circuit 100' can remain operational even if the additional device components 204 are powered down or not receiving or using power.

The device 200 also includes a housing or case 206, which represents any suitable structure configured to encase, protect, or otherwise contain components of the device 200. The housing or case 206 could be formed from any suitable material(s) and in any suitable manner. Depending on the function of the device 200, the device 200 may further include at least one cable 208 and/or at least one antenna 210. Each cable 208 represents any suitable structure through which data, power, or other signals could be transported to or from the device 200. Each antenna 210 represents any suitable structure through which wireless signals can be transmitted from or received by the device 200.

As noted above, the surge detection circuit 100' could be configured to detect surges associated with the device 200 in various ways. For instance, the surge detection circuit 100' could be connected to or sense surges in the housing or case 206 of the device 200. The surge detection circuit 100' could also or alternatively be connected to a cable 208 and/or antenna 210, such as by using at least one splitter that connects both the surge detection circuit 100' and the additional device components 204 to the cable 208 and/or antenna 210.

As shown in FIG. 3, the device 300 includes a surge detection circuit 100'', which could include the same or similar components as the surge detection circuit 100 of FIG. 1 described above. The device 300 also includes additional device components 304, a housing or case 306, and possibly one or more cables 308 and/or one or more antennas 310. These components could be the same as or similar to the corresponding components 204-210 described above.

The device 300 here also includes a power supply 302, which can provide operating power to one or more components of the surge detection circuit 100'' and to other components of the device 300, such as the components 304. The power supply 302 represents any suitable source of operating power for the device 300, such as one or more batteries, supercapacitors, solar cells, fuel cells, or alternating current (AC) power adapters.

Note that in either of the devices 200 and 300 shown in FIGS. 2 and 3, the surge detection circuits 100' and 100'' can be implemented in a module manner. For example, the isolation and signal conditioning unit 102, the processing unit 104, and the interface unit 106 could be physically implemented using separate modules that can be coupled together to form the surge detection circuits 100' or 100''. As a result, it is possible to use existing components of a device along with one or more modules to create a surge detection circuit. Of course, this need not be the case.

Although FIGS. 2 and 3 illustrate examples of devices 200 and 300 containing surge detection circuits 100' and 100'', various changes may be made to FIGS. 2 and 3. For example, the surge detection circuits 100' and 100'' could be powered in any other suitable manner. Also, the surge detection circuits 100' and 100'' could be used in or with any other suitable devices or systems (whether or not used for industrial process control and automation).

Figure 4:
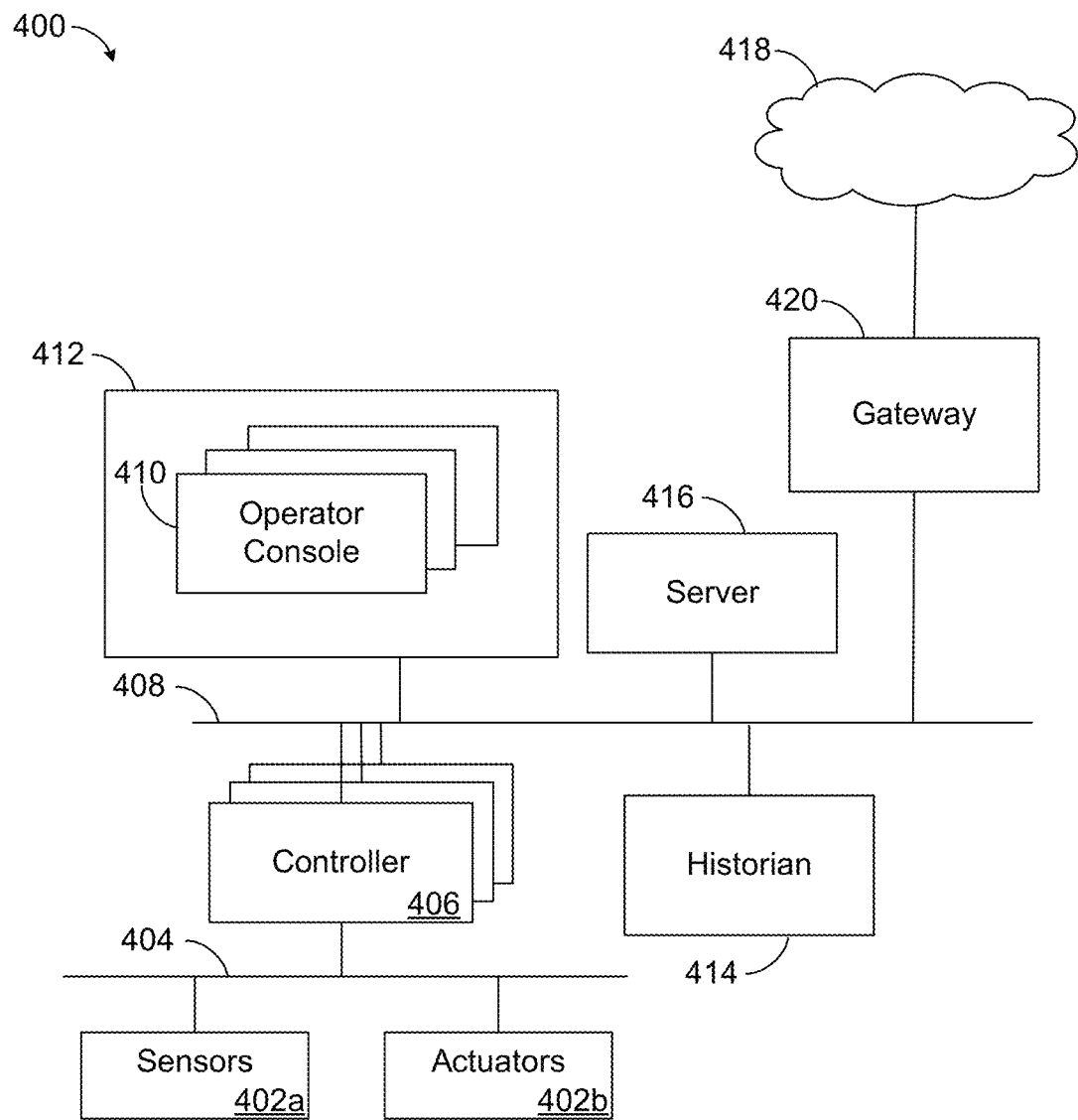
FIG. 4 illustrates an example system containing one or more devices having surge detection circuits according to this disclosure.

FIG. 4 illustrates an example system 400 containing one or more devices having surge detection circuits according to this disclosure. In particular, FIG. 4 illustrates an example industrial process control and automation system. As shown in FIG. 4, the system 400 includes various components that facilitate production or processing of at least one product or other material. For instance, the system 400 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 4, the system 400 includes one or more sensors 402a and one or more actuators 402b. The sensors 402a and actuators 402b represent components in a process system that may perform any of a wide variety of functions. For example, the sensors 402a could measure a wide variety of characteristics in the process system, such as pressure, temperature, or flow rate. Also, the actuators 402b could alter a wide variety of characteristics in the process system. Each of the sensors 402a includes any suitable structure for measuring one or more characteristics in a process system.

Each of the actuators 402b includes any suitable structure for operating on or affecting one or more conditions in a process system.

At least one network 404 is coupled to the sensors 402a and actuators 402b. The network 404 facilitates interaction with the sensors 402a and actuators 402b. For example, the network 404 could transport measurement data from the sensors 402a and provide control signals to the actuators 402b. The network 404 could represent any suitable network or combination of networks. As particular examples, the network 404 could represent at least one Ethernet network, electrical signal network (such as a HART network), pneumatic control signal network, or any other or additional type(s) of network(s).

The system 400 also includes various controllers 406. The controllers 406 can be used in the system 400 to perform various functions in order to control one or more industrial processes. For example, a first set of controllers 406 may use measurements from one or more sensors 402a to control the operation of one or more actuators 402b. A second set of controllers 406 could be used to optimize the control logic or other operations performed by the first set of controllers. A third set of controllers 406 could be used to perform additional functions. The controllers 406 can communicate via one or more networks 408 and associated switches, firewalls, and other components.

Each controller 406 includes any suitable structure for controlling one or more aspects of an industrial process. At least some of the controllers 406 could, for example, represent programmable logic controllers (PLCs), proportional-integral-derivative (PID) controllers, or multivariable controllers such as controllers implementing model predictive control (MPC) or other advanced predictive control (APC). As a particular example, each controller 406 could represent a computing device running a real-time operating system, a WINDOWS operating system, or other operating system.

Operator access to and interaction with the controllers 406 and other components of the system 400 can occur via various operator consoles 410. Each operator console 410 could be used to provide information to an operator and receive information from an operator. For example, each operator console 410 could provide information identifying a current state of an industrial process to the operator, such as values of various process variables and alarms associated with the industrial process. Each operator console 410 could also receive information affecting how the industrial process is controlled, such as by receiving setpoints or control modes for process variables controlled by the controllers 406 or other information that alters or affects how the controllers 406 control the industrial process. Each operator console 410 includes any suitable structure for displaying information to and interacting with an operator. For example, each operator console 410 could represent a computing device running a WINDOWS operating system or other operating system.

Multiple operator consoles 410 can be grouped together and used in one or more control rooms 412. Each control room 412 could include any number of operator consoles 410 in any suitable arrangement. In some embodiments, multiple control rooms 412 can be used to control an industrial plant, such as when each control room 412 contains operator consoles 410 used to manage a discrete part of the industrial plant.

The control and automation system 400 here also includes at least one historian 414 and one or more servers 416. The historian 414 represents a component that stores various information about the system 400. The historian 414 could, for instance, store information that is generated by the various controllers 406 during the control of one or more industrial processes. The historian 414 includes any suitable structure for storing and facilitating retrieval of information. Although shown as a single component here, the historian 414 could be located elsewhere in the system 400, or multiple historians could be distributed in different locations in the system 400.

Each server 416 denotes a computing device that executes applications for users of the operator consoles 410 or other applications. The applications could be used to support various functions for the operator consoles 410, the controllers 406, or other components of the system 400. Each server 416 could represent a computing device running a WINDOWS operating system or other operating system. Note that while shown as being local within the control and automation system 400, the functionality of the server 416 could be remote from the control and automation system 400. For instance, the functionality of the server 416 could be implemented in a computing cloud 418 or a remote server communicatively coupled to the control and automation system 400 via a gateway 420. It is also possible to implement common or different functions using the server 416 and the computing cloud 418 or remote server.

As described above, various components in the system 400 could include or operate in conjunction with surge detection circuits, such as the surge detection circuits 100, 100', 100" described above. For example, any sensor 402a, actuator 402b, controller 406, or other component located outside could include a surge detection circuit in order to sense lightning strikes or other surges. Moreover, the surge detection circuits in the system 400 could provide information about detected surge events to any suitable destination(s), such as one or more controllers 406, the historian 414, the server 416, or the computing cloud 418 or remote server.

Information about surge events detected by one or more devices in the system 400 could be used in any suitable manner. For example, surge detection circuits associated with the devices in the system 400 could record and transmit information about detected surges for presentation on one or more of the operator consoles 410, for storage in the historian 414, or for analysis by the server 416 or computing cloud 418 or remote server. This information could be used to identify devices in the system 400 that have been struck by lightning or suffered from other surges and may therefore be in need of repair (and possibly replacement). This information could also be used to determine whether devices in a particular area of the system 400 require further surge protection or less/no surge protection. This information could further be used to perform advanced or predictive maintenance.

As a particular example, the information generated by the surge detection circuits for devices in the system 400 could be used to generate a surge or strike map of a plant or facility in which the system 400 is located. The surge or strike map can identify locations in the plant or facility where surges have been detected, optionally along with the severities of the detected surges. The surge or strike map can therefore be used to identify patterns in the surges, which could help to identify areas of the plant or facility where new/additional surge protection may be needed or where less/no surge protection may be needed. The surge or strike map could also be used to identify equipment in the plant or facility that may require fewer inspections or more inspections for surge-related damage.

As another particular example, the information generated by the surge detection circuits for devices in the system 400 could be used to control one or more industrial processes. For instance, a controller 406 could receive information identifying surges associated with one or more sensors 402a or actuators 402b. The controller 406 could display information about the surges to a human operator, such as via an operator console 410. The controller 406 or human operator could take any suitable action in response to the surges, such as verifying certain sensor measurements with other or redundant measurements or transitioning a controller from a control mode to a supervisory mode or a monitoring mode. A control mode generally represents a mode in which a controller is actively controlling an industrial process. A supervisory mode generally represents a mode in which a controller allows a human operator to supervise control of an industrial process. A monitoring mode generally represents a mode in which a controller monitors but does not control an industrial process, such as when the controller receives process variable measurements but does not alter an industrial process based on those process variable measurements. The transitioning of a controller's mode of operation to supervisory mode or monitoring mode alters how a controller operates and therefore alters how an industrial process behaves.

As yet another particular example, a device with a surge detection circuit in the system 400 could be damaged or destroyed due to a surge. Personnel could retrieve a local storage device 122 from the surge detection circuit of the device, such as by physically removing a Flash drive or other removable storage device. The personnel could insert or attach the storage device 122 to another device (such as an operator console 410 or other computing device) and read the contents of the storage device 122. The contents of the storage device 122 could be used to verify whether the device was damaged or destroyed due to a lightning strike or other surge. The ability to confirm whether the device was actually damaged or destroyed due to a lightning strike or other surge can help in the determination of whether additional surge protections are needed.

Although FIG. 4 illustrates one example of a system 400 containing one or more devices having surge detection circuits, various changes may be made to FIG. 4. For example, the system 400 could include any number of sensors, actuators, controllers, networks, operator consoles, control rooms, historians, servers, and other components. Also, the makeup and arrangement of the system 400 in FIG. 4 are for illustration only. Components could be added, omitted, combined, further subdivided, or placed in any other suitable configuration according to particular needs. Further, particular functions have been described as being performed by particular components of the system 400. This is for illustration only. In general, control and automation systems are highly configurable and can be configured in any suitable manner according to particular needs. In addition, while FIG. 4 illustrates one example operational environment where surge detection circuits could be used, this functionality can be used in any other suitable system (and that system need not relate to industrial process control and automation).

Figure 5:
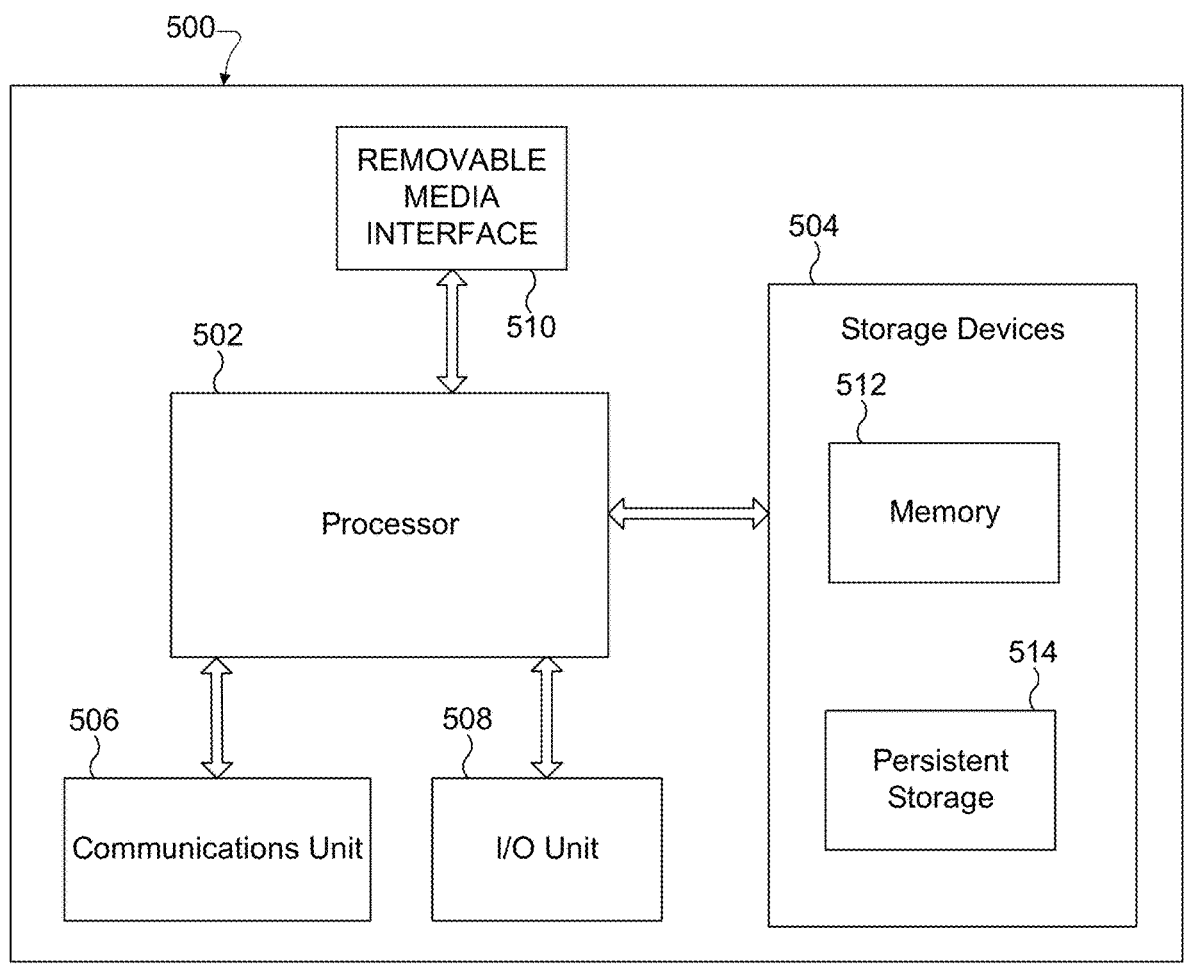
FIG. 5 illustrates an example device for processing information related to surge detection in wireless transmitters and other devices according to this disclosure.

FIG. 5 illustrates an example device 500 for processing information related to surge detection in wireless transmitters and other devices according to this disclosure. The device 500 could, for example, represent a controller, operator console, or other device in the system 400 of FIG. 4 that receives and processes surge information. Note, however, that the device 500 could be used in any other suitable system, and the system does not need to perform industrial process control and automation functions.

As shown in FIG. 5, the computing device 500 includes at least one processor 502, at least one storage device 504, at least one communications unit 506, at least one I/O unit 508, and optionally at least one removable media interface 510. Each processor 502 can execute instructions, such as those that may be loaded into a memory 512. Each processor 502 denotes any suitable processing device, such as a microprocessor, microcontroller, DSP, ASIC, FPGA, or discrete circuitry.

The memory 512 and a persistent storage 514 are examples of storage devices 504, each of which represents any structure configured to store and facilitate retrieval of information (such as data, program code, and/or other suitable information on a temporary or permanent basis). Each memory 512 may represent a RAM or any other suitable volatile or non-volatile storage device. The persistent storage 514 may contain one or more components or devices supporting longer-term storage of data, such as a ROM, hard drive, Flash memory, or optical disc.

The communications unit 506 supports communications with other systems or devices. For example, the communications unit 506 could include at least one network interface card or wireless transceiver facilitating communications over at least one wired or wireless network. The communications unit 506 may support communications through any suitable physical or wireless communication link(s).

The I/O unit 508 allows for input and output of data. For example, the I/O unit 508 may provide a connection for user input through a keyboard, mouse, keypad, touchscreen, or other suitable input device. The I/O unit 508 may also send output to a display, printer, or other suitable output device.

Each removable media interface 510 denotes a structure to which a storage device can be coupled. For example, the device 500 could include one or more Universal Serial Bus (USB) slots, SD or other Flash memory slots, or other interfaces for coupling to storage devices. Depending on the implementation, the device 500 could include a single removable media interface 510 or multiple removable media interfaces 510 of the same type or of different types.

The processor 502 could receive information associated with surge events, such as via its communications unit 506 or removable media interface 510. The processor 502 could analyze the surge information to perform various tasks. For example, the processor 502 could present surge-related information to one or more users, such as via one or more operator consoles 410. The processor 502 could generate surge or strike maps or generate alarms, warnings, or other notifications in an industrial process control and automation system. The processor 502 could use the surge-related information to perform advanced or predictive maintenance. The processor 502 could perform any other or additional analyses as needed or desired.

Although FIG. 5 illustrates one example of a device 500 for processing information related to surge detection in wireless transmitters and other devices, various changes may be made to FIG. 5. For example, various components in FIG. 5 could be combined, further subdivided, or omitted and additional components could be added according to particular needs. Also, computing devices can come in a wide variety of configurations, and FIG. 5 does not limit this disclosure to any particular configuration of computing device.

Figure 6:
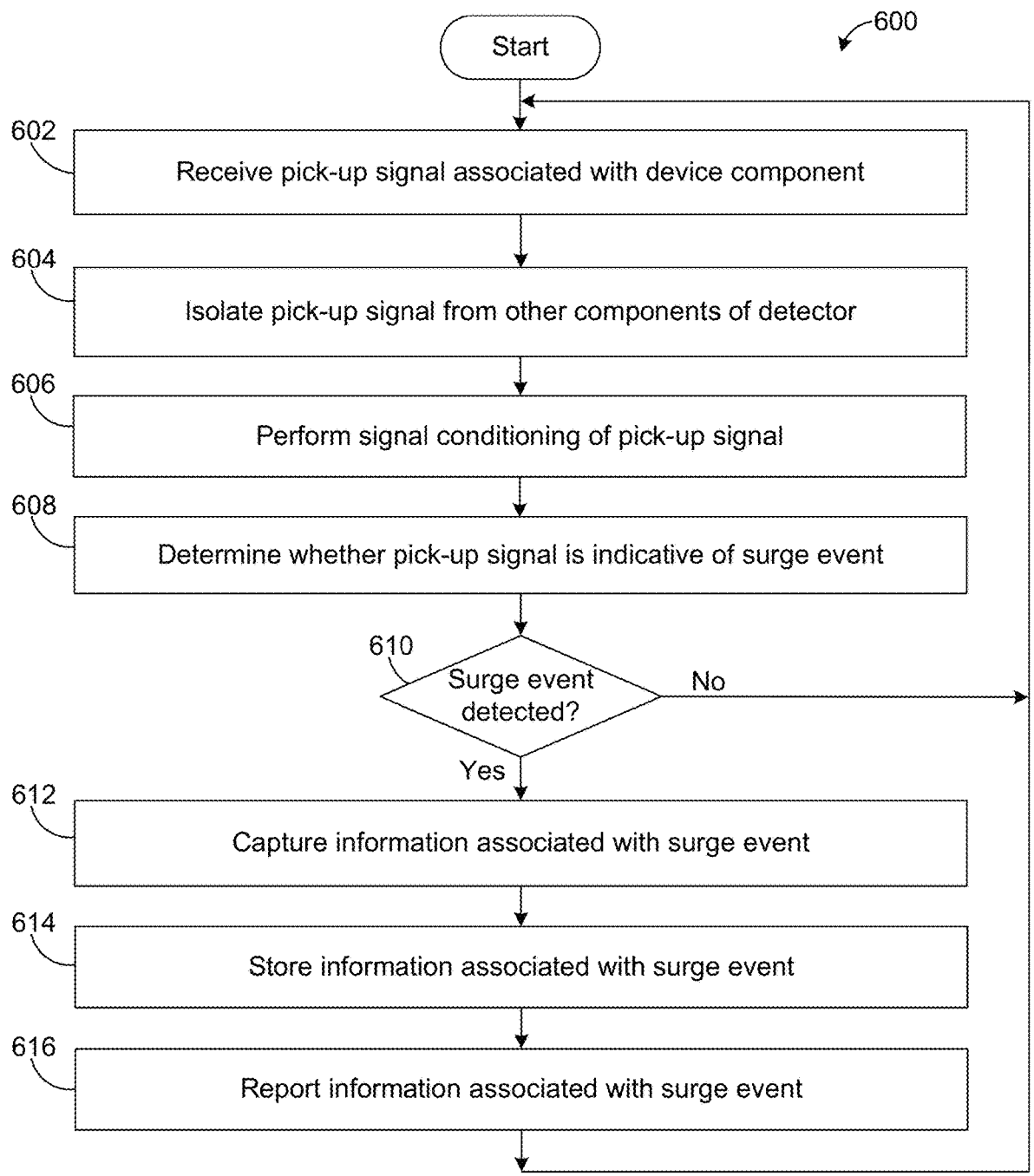
FIG. 6 illustrates an example method for lightning or other surge detection in wireless transmitters and other devices according to this disclosure.

FIG. 6 illustrates an example method 600 for lightning or other surge detection in wireless transmitters and other devices according to this disclosure. For ease of explanation, the method 600 is described as being performed using the surge detection circuit 100 of FIG. 1, which could be used in the devices 200 and 300 of FIGS. 2 and 3 within the system 400 of FIG. 4. However, the method 600 could be performed using any suitable device and in any suitable system.

As shown in FIG. 6, a pick-up signal associated with one or more device components is received at step 602. This could include, for example, the signal pick-up 108 receiving or generating a signal based on the voltage or current present on a device case 206 or 306, cable 208 or 308, antenna 210 or 310, or other device component. The pick-up signal is isolated from other components of the detector at step 604 and undergoes signal conditioning at step 606. This could include, for example, the voltage/current isolator 110 using transformer isolation, optical isolation, a large impedance, or other isolation technique to prevent the pick-up signal from damaging other components of the surge detection circuit 100. This could also include the signal conditioner 112 performing clamping, rectification, and scaling of the pick-up signal to convert the pick-up signal into a form suitable for use by the processing unit 104.

A determination is made whether the pick-up signal is indicative of a surge event at step 608. This could include, for example, the processor 114 determining whether the output of the signal conditioner 112 exceeds one or more threshold voltage or current levels. If not, a determination is made at step 610 that a surge event has not been detected, and the process returns to step 602 to continue processing pick-up signals.

Otherwise, a determination is made at step 610 that a surge event has been detected, and information associated with the surge event is captured at step 612. This could include, for example, the processor 114 generating an identification of the event. This could also include the processor 114 identifying one or more characteristics of the event, such as a date/time stamp, a severity, a duration, a shape, or a profile. The severity could be based on the specific threshold value that is exceeded. The duration could be based on the length of time that a threshold value is exceeded. The shape or profile could be based on the amplitude of the output of the signal conditioner 112 over time. This could further include the processor 114 incrementing a counter that identifies the number of surges in a given time period. Any other or additional information associated with the surge event could be captured here.

The captured information can be used in any suitable manner. For example, the captured information could be stored at step 614 and/or reported at step 616. This could include, for example, the processor 114 outputting the information to an interface 120 for communication over one or more networks or other communication links. This could also include the processor 114 outputting the information to an interface 120 for storage in a storage device 122.

Although FIG. 6 illustrates one example of a method 600 for lightning or other surge detection in wireless transmitters and other devices, various changes may be made to FIG. 6. For example, while shown as a series of steps, various steps in FIG. 6 could overlap, occur in parallel, occur in a different order, or occur any number of times.

Figure 7:
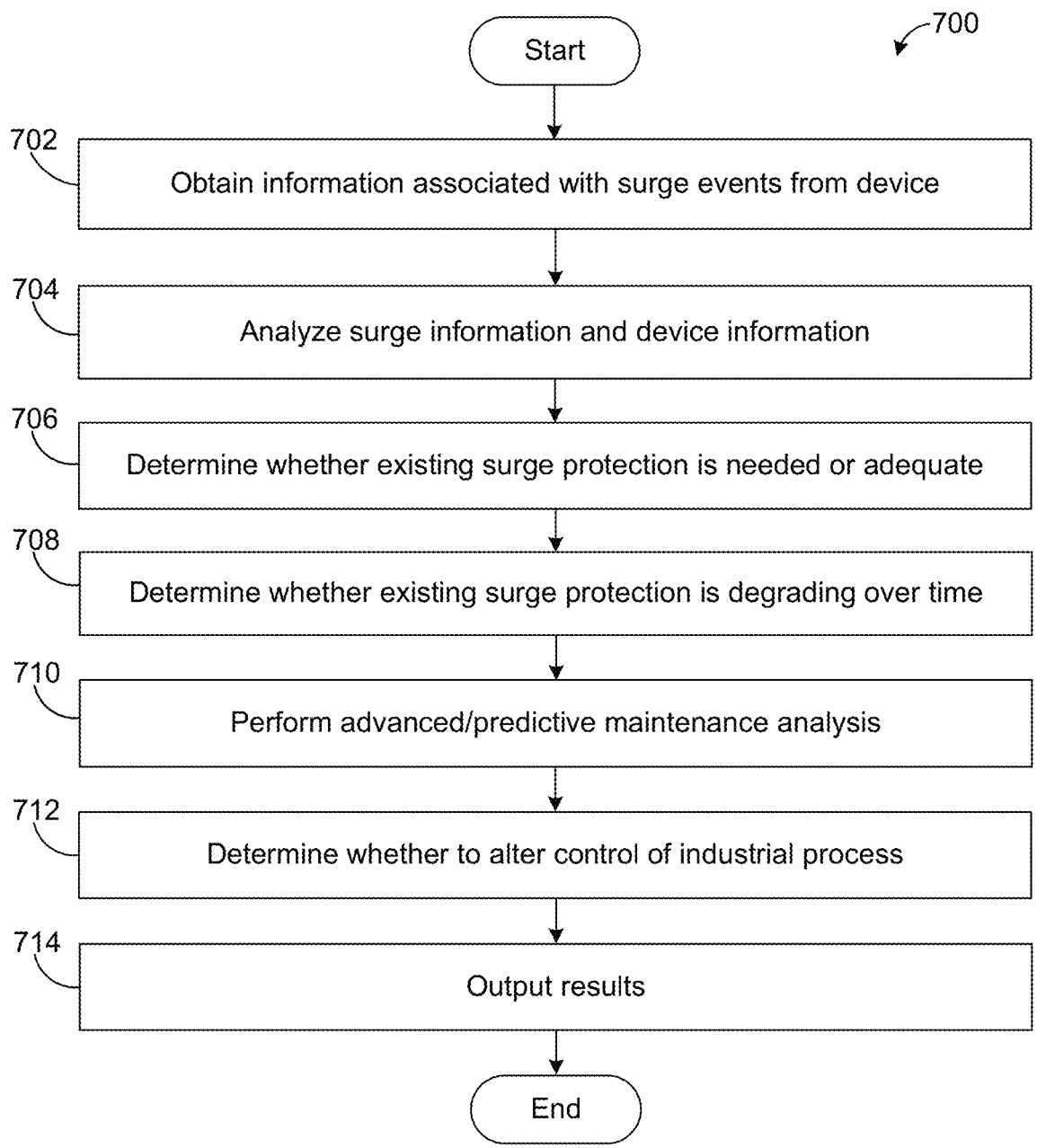
FIG. 7 illustrates an example method for processing information related to surge detection in wireless transmitters and other devices according to this disclosure.

FIG. 7 illustrates an example method 700 for processing information related to surge detection in wireless transmitters and other devices according to this disclosure. For ease of explanation, the method 700 is described as being performed using the device 500 of FIG. 5, which could be used within the system 400 of FIG. 4. However, the method 700 could be performed using any suitable device and in any suitable system.

As shown in FIG. 7, information associated with surge events is obtained from one or more devices at step 702. This could include, for example, the processor 502 receiving information generated by a surge detection circuit 100 of a device, such as the device 200 or 300. The information associated with the surge events could be received over one or more network or other communication links, retrieved from one or more storage devices 122, or obtained in any other suitable manner.

The information is analyzed at step 704, and one or more determinations can be made based on the analysis at steps 706-712. This could include, for example, the processor 502 analyzing the information and determining whether existing surge protections for the devices are adequate or needed at step 706. For instance, if a device experiences no surge events, there may be little or no need to include surge protection mechanisms in or with the device. If a device experiences numerous surge events, there may be a need to increase the surge protection mechanisms used in or with the device. This could also include the processor 502 analyzing the information and determining whether existing surge protections for the devices might be degrading over time at step 708. For instance, one or more large surge events or numerous small surge events could be indicative that the existing surge protection for a device may have degraded over time. This could further include the processor 502 analyzing the information and performing advanced or predictive maintenance at step 710. For instance, a determination can be made whether to improve the ground quality for the devices, or a strike or surge map could be generated to identify patterns in surges. In addition, this could include the processor 502 analyzing the information and determining whether a process controller should have its control mode changed or whether the process controller should stop using data, use different data, or shut down or alter an industrial process. Note that one, some, or all of steps 706-712 could occur depending on the implementation.

The results of the analysis are output at step 714. This could include, for example, the processor 502 outputting the analysis results or any identified recommendations to one or more users, such as via one or more display screens of one or more operator consoles 410. This could also include the processor 502 interacting with one or more controllers 406 to change one or more control modes in order to alter how an industrial process is being controlled.

Although FIG. 7 illustrates one example of a method 700 for processing information related to surge detection in wireless transmitters and other devices, various changes may be made to FIG. 7. For example, while shown as a series of steps, various steps in FIG. 7 could overlap, occur in parallel, occur in a different order, or occur any number of times. Also, any other or additional analyses could be performed using surge information collected from one or more devices.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrases "at least one of" and "one or more of," when used with a list of items, mean that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for detecting surge in voltage in a device, the method comprising:
    obtaining a voltage signal or a current signal associated with a component of the device, the component including a case, a cable or an antenna, wherein a signal pickup is physically coupled to the component to receive a voltage directly from the component, the signal pick-up receiving or generating the voltage signal or the current signal based on the voltage or a current present on the component of the device;
    isolating and conditioning the voltage signal or the current signal with an isolating and signal conditioning unit operable to generate an output signal, the isolating and signal conditioning unit comprising a voltage/current isolator operable to isolate the voltage signal and the current signal and a signal conditioner operable to condition the voltage signal and the current signal, the signal conditioner comprising a structure operable to alter the voltage and the current, the structure comprising at least one of: a voltage clamp, a current clamp, a rectifier, a voltage scaler, and a current scaler;
    processing the output signal to identify one or more surge events, each surge event among the one or more surge events associated with an excessive voltage or the current experienced by the device;
    generating information associated with the one or more surge events; and
    transmitting or storing the information.

2. The method of claim 1, wherein:
    the information associated with the one or more surge events comprises a date/time stamp identifying when the each surge event among the one or more surge events occurred; and
    the current/voltage isolator comprises a structure operable to provide electrical isolation, the current/voltage isolator comprising at least one of: an electrical transformer, and an optical isolator.

3. The method of claim 1, wherein the information associated with the one or more surge events comprises at least one of: a severity of the each surge event, and a shape or a profile of the each surge event.

4. The method of claim 1, wherein isolating and conditioning the voltage or current signal comprises converting the voltage or current signal into a form for input to a digital processor.

5. The method of claim 1, wherein obtaining the voltage or current signal comprises obtaining the voltage or current signal from a case or housing of the device, a cable coupled to the device, or an antenna coupled to the device.

6. The method of claim 1, wherein transmitting or storing the information comprises at least one of:
    storing the information in a removable memory device; and
    transmitting the information over a wired or wireless connection.

7. An apparatus for detecting surge in voltage in a device comprising:
    a voltage/current isolator operable to receive and isolate a voltage signal or a current signal associated with a component of the device, the component including a case, a cable or an antenna, wherein a signal pickup is physically coupled to the component to receive a voltage directly from the component, the signal pick-up receiving or generating the voltage signal or the current signal based on a voltage or a current present on the component of the device;
    an isolating and signal conditioning unit operable to isolate and condition the voltage signal or the current signal and generate an output signal, the isolating and signal conditioning unit including the voltage/current isolator operable to isolate the voltage signal and the current signal and a signal conditioner operable to condition the voltage signal and the current signal, the signal conditioner comprising a structure operable to alter the voltage and the current, the structure comprising at least one of: a voltage clamp, a current clamp, a rectifier, a voltage scaler, and a current scaler;
    at least one processor configured to process the output signal, identify one or more surge events, and generate information associated with the one or more surge events, each surge event among the one or more surge associated with an excessive voltage or current experienced by the device; and an interface configured to transmit or store the information.

8. The apparatus of claim 7, wherein:

the information associated with the one or more surge events comprises a date/time stamp identifying when the each surge event among the one or more surge events occurred; and the current/voltage isolator comprises a structure operable to provide electrical isolation, the current/voltage isolator comprising at least one of: an electrical transformer, and an optical isolator.

9. The apparatus of claim 7, wherein the information associated with the one or more surge events comprises at least one of: a severity of the each surge event, and a shape or a profile of the each surge event.

10. The apparatus of claim 7, further comprising:

a signal pick-up configured to obtain the voltage or current signal from a case or housing of the device, a cable coupled to the device, or an antenna coupled to the device.

11. The apparatus of claim 7, wherein the interface is configured to at least one of:

store the information in a removable memory device; and transmit the information over a wired or wireless connection.

12. The apparatus of claim 7, wherein the voltage/current isolator and the signal conditioner form a module configured to be coupled to the at least one processor.

13. The apparatus of claim 7, further comprising:

at least one visual indicator configured to visually identify that the one or more surge events have been detected.

14. The apparatus of claim 7, further comprising:

a power supply configured to provide operating power to at least the apparatus.

15. The apparatus of claim 14, wherein the power supply is configured to provide the operating power to the apparatus and to provide operating power to one or more other components of the device.

16. A method comprising:

isolating and conditioning a voltage signal or a current signal with an isolating and signal conditioning unit operable to generate an output signal, the isolating and signal conditioning unit comprising a voltage/current isolator operable to isolate the voltage signal and the current signal and a signal conditioner operable to condition the voltage signal and the current signal, the signal conditioner comprising a structure operable to alter the voltage and the current, the structure comprising at least one of: a voltage clamp, a current clamp, a rectifier, a voltage scaler, and a current scaler;

processing the output signal to identify one or more surge events, each surge event among the one or more surge events associated with at least one of an excessive voltage or a current experienced by a device in an industrial process control and automation system;

generating information associated with the one or more surge events;

receiving the information identifying the one or more surge events associated with one or more components of the device in the industrial process control and automation system, the one or more components including at least two or more of: a case, a cable and an antenna, wherein a signal pickup is physically coupled to the one or more components to receive a voltage directly from the one or more components, the signal pick-up receiving or generating a voltage signal or a current signal based on a voltage or a current present on the one or more components of the device; and changing a mode of operation of at least one process controller based on the information, wherein the changing to the mode of operation of the at least one process controller alters how at least one industrial process of the industrial process control and automation system is controlled by the at least one process controller.

17. The method of claim 16, wherein changing the mode of operation comprises changing the mode of operation from a control mode to a supervisory mode or a monitoring mode.

18. The method of claim 16, wherein:

the device comprises the at least one process controller; and the information identifies at least one surge event associated with the at least one process controller.

19. The method of claim 16, further comprising:

processing the information to at least one of:

determine whether existing surge protection for the device is adequate, is needed, or is degrading over time; and determine whether maintenance of the device is needed.

20. The method of claim 16, further comprising processing the information to create a map of surges for a given area.

* * * * *